United States Patent
Li et al.

(10) Patent No.: US 12,334,110 B2
(45) Date of Patent: Jun. 17, 2025

(54) IMAGE DECODING DEVICE AND STILL FRAME IMAGE DECODING METHOD THEREOF

(71) Applicant: SigmaStar Technology Ltd., Fujian (CN)

(72) Inventors: Bo-Zai Li, Shenzhen (CN); Song Rao, Shenzhen (CN)

(73) Assignee: SIGMASTAR TECHNOLOGY LTD., Fujian (CN)

( * ) Notice: Subject to any disclaimer, the term of this patent is extended or adjusted under 35 U.S.C. 154(b) by 117 days.

(21) Appl. No.: 18/467,827

(22) Filed: Sep. 15, 2023

(65) Prior Publication Data

US 2024/0265947 A1    Aug. 8, 2024

(30) Foreign Application Priority Data

Feb. 6, 2023   (CN) .......................... 202310126234.X (51) Int. Cl.
| | | |
|---|---|---|
| *G11B 20/10* | (2006.01) | |
| *G11B 20/00* | (2006.01) | |
| *G11B 27/031* | (2006.01) | |
| *H04N 19/172* | (2014.01) | |

(52) U.S. Cl.
CPC .. *G11B 20/10527* (2013.01); *G11B 20/00007* (2013.01); *G11B 27/031* (2013.01); *H04N 19/172* (2014.11); *G11B 2020/00072* (2013.01)

(58) Field of Classification Search
CPC ........ G11B 20/10527; G11B 20/00007; G11B 27/031; G11B 2020/00072; H04N 19/172
See application file for complete search history.

(56) References Cited

U.S. PATENT DOCUMENTS

| | | | | |
|---|---|---|---|---|
| 2008/0112485 | A1* | 5/2008 | Adachi | H04N 19/61 |
| | | | | 375/E7.22 |
| 2008/0253446 | A1* | 10/2008 | Kosuge | H04N 21/41422 |
| | | | | 375/240.01 |
| 2017/0150165 | A1* | 5/2017 | Na | H04N 19/176 |

* cited by examiner

*Primary Examiner* — Sunghyoun Park
(74) *Attorney, Agent, or Firm* — Edell, Shapiro & Finnan, LLC (57) ABSTRACT

A still frame image decoding method includes: decoding a first frame in first data of multiple data according to a reference frame at a reference location of a memory, and storing the first frame to the reference location to overwrite at least one part of the reference frame; selecting the first data from the multiple data and decoding a second frame in the first data according to the first frame at the reference location in response to a still frame command; adjusting the second frame, and storing the adjusted second frame to an output location of the memory; preserving the first frame at the reference location; and again decoding the second frame according to the first frame at the reference location according to an end command, so as to store the second frame to the reference location to overwrite at least one part of the first frame.

18 Claims, 5 Drawing Sheets

IMAGE DECODING DEVICE AND STILL FRAME IMAGE DECODING METHOD THEREOF

This application claims the benefit of China application Serial No. CN202310126234.X, filed on Feb. 6, 2023, the subject matter of which is incorporated herein by reference.

BACKGROUND OF THE INVENTION

Field of the Invention

The present application relates to an image decoding device, and more particularly to an image decoding device having a still frame function and a still frame image decoding method thereof.

Description of the Related Art

In multi-channel video applications, an image decoding device is capable of temporarily pausing video playback, and allowing a user to browse one single still picture of a given channel. In some related art, a decoder constantly updates an internal buffer and hence loses original reference frames, such that the one single still picture can only be generated by using data of a scaled up/down or cropped image after a still frame command is received. As a result, the picture may become distorted and unclear.

SUMMARY OF THE INVENTION

In some embodiments, it is an object of the present application to provide an image decoding device having a still frame function and a still frame image decoding method thereof so as to improve the issues of the prior art.

In some embodiments, a still frame image decoding method includes the following operations: decoding a first video frame in first data of multiple video data according to a reference frame at a reference location of a memory, and storing the first frame to the reference location to overwrite at least one part of the reference frame; selecting the first video data from the multiple video data and decoding a second frame in the first video data according to the first frame at the reference location in response to a still frame command; adjusting the second frame, and storing the adjusted second frame to an output location of the memory; preserving the first frame at the reference location in response to the still frame command, so as to again decode the second frame according to the first frame at the reference location; and again decoding the second frame according to the first frame at the reference location according to an end command, so as to store the second frame to the reference location to overwrite at least one part of the first frame.

In some embodiments, an image decoding device includes a video receiving circuit, an image adjusting circuit and a decoder. The video receiving circuit receives multiple video data corresponding to different channels. The decoder is configured to: decode a first frame in first video data of the multiple video data according to a reference frame at a reference location of a memory, and store the first frame to the reference location to overwrite at least one part of the reference frame; and select the first video data from the multiple video data and decode a second frame in the first video data according to the first frame at the reference location in response to a still frame command. The image adjusting circuit adjusts the second frame, and stores the adjusted second frame to an output location of the memory. The decoder is further configured to: preserve the first frame at the reference location in response to the still frame command, so as to again decode the second frame according to the first frame at the reference location; and again decode the second frame according to the first frame at the reference location in response to an end command, so as to store the second frame to the reference location to overwrite at least one part of the first frame.

Features, implementations and effects of the present application are described in detail in preferred embodiments with the accompanying drawings below.

BRIEF DESCRIPTION OF THE DRAWINGS

To better describe the technical solution of the embodiments of the present application, drawings involved in the description of the embodiments are introduced below. It is apparent that, the drawings in the description below represent merely some embodiments of the present application, and other drawings apart from these drawings may also be obtained by a person skilled in the art without involving inventive skills.

DETAILED DESCRIPTION OF THE INVENTION

All terms used in the literature have commonly recognized meanings. Definitions of the terms in commonly used dictionaries and examples discussed in the disclosure of the present application are merely exemplary, and are not to be construed as limitations to the scope or the meanings of the present application. Similarly, the present application is not limited to the embodiments enumerated in the description of the application.

The term "coupled" or "connected" used in the literature refers to two or multiple elements being directly and physically or electrically in contact with each other, or indirectly and physically or electrically in contact with each other, and may also refer to two or more elements operating or acting with each other. As given in the literature, the term "circuit" may be a device connected by at least one transistor and/or at least one active element by a given means so as to process signals.

Figure 1:
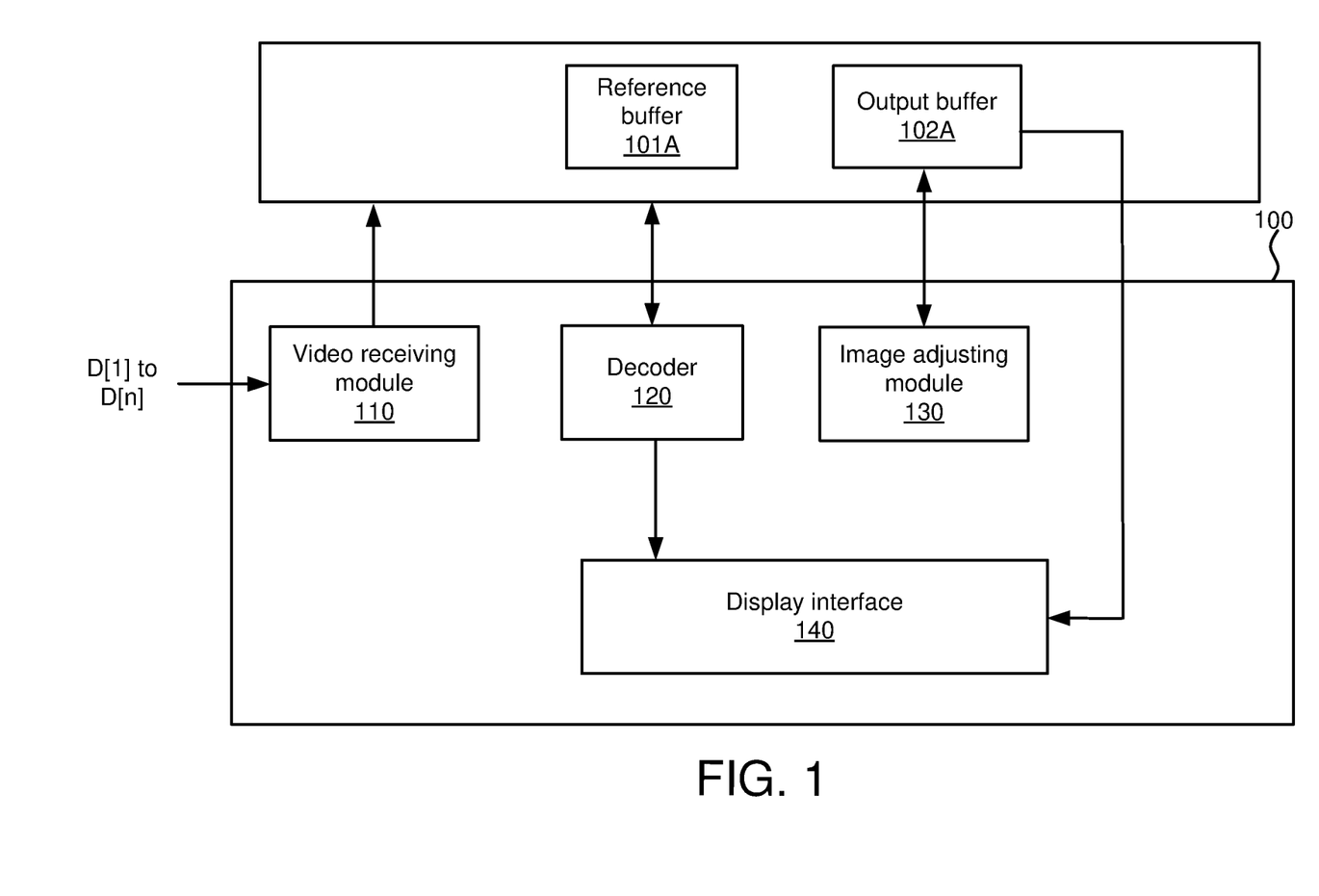
FIG. 1 is a schematic diagram of an image decoding device according to some embodiments of the present application.

FIG. 1 shows a schematic diagram of an image decoding device 100 according to some embodiments of the present application. In some embodiments, the image decoding device 100 has a still frame function. In some embodiments, the image decoding device 100 is capable of performing a still frame function in response to a still frame command. The still frame function enables the image decoding device 100 to pause the original decoding operations, and generate a specific still image having a clear resolution for viewing by a user.

The image decoding device 100 includes a video receiving module 110, a decoder 120, an image adjusting module 130 and a display interface 140. The video receiving module 110 can receive multiple video data D[1] to D[n] through different channels, where n may be a positive integer greater than or equal to 1. In some embodiments, the video receiving module 110 may include multiple data transmission interfaces, which respectively correspond to different channels so as to receive the multiple video data D[1] to D[n]. The video receiving module 110 stores the multiple video data D[1] to D[n] received to a memory 100A. In some embodiments, the multiple video data D[1] to D[n] may be, for example but not limited to, a data stream. In some embodiments, the memory 100A may be, for example but not limited to, a dynamic random access memory (DRAM).

The decoder 120 can obtain the multiple video data D[1] to D[n] from the memory 100A, and decode each frame in the multiple video data D[1] to D[n]. In some embodiments, the memory 100A includes a reference buffer 101A and an output buffer 102A. In some embodiments, the reference buffer 101A may be located at a reference location (which may correspond to one or more memory addresses) in the memory 100A, and can store reference frames used for image decoding. In some embodiments, the output buffer 102A may be located at an output location (which may correspond to one or more memory addresses and is different from the reference location) in the memory 100A, and can store decoded frames awaiting to be displayed. Taking the video data D[1] for example, the video data D[1] may sequentially include a first frame, a second frame and a third frame. The decoder 120 can decode the first frame by means of intra-frame coding, and store the decoded first frame to the reference buffer 101A. The image adjusting module 130 can adjust the decoded first frame and store the adjusted first frame to the output buffer 102A. Thus, the display interface 140 can output the first frame awaiting to be displayed from the output buffer 102A to a screen, for display a corresponding image content on the screen. In some embodiment, the decoder 120 may include an image decoder circuit, and the image adjusting module 130 may include an image scaling circuit, an image cropping circuit and an image tiling circuit.

Moreover, a reference frame in the reference buffer 101A is the first frame. Next, the decoder 120 can decode the second frame by means of inter-frame coding according to the decoded first frame in the reference buffer 101A, and store the decoded second frame to the reference buffer 101A and output the same to the image adjusting module 130. The image adjusting module 130 adjusts the decoded second frame, which is adjusted by the image adjusting module 130 into the second frame awaiting to be displayed and is stored to the output buffer 102A. Thus, the display interface 140 can output the second frame awaiting to be displayed from the output buffer 102A to the screen for displaying the corresponding image content, and the decoder 120 can decode the third frame according to the second frame in the reference buffer 101A. Similarly, related operations of the decoder 120 can be understood accordingly. In some embodiments, inter-frame coding compresses data based on the correlation of multiple consecutive frames, and uncompresses video coding data referring to previous frames (that is, the reference frames in the reference buffer 101A). In some embodiments, the decoder 120 may also store the decoded second frame to the output buffer 102A, and the image adjusting module 130 may read the second frame from the output buffer 102A and adjust the second frame into a frame awaiting to be displayed, and finally store the second frame awaiting to be displayed to the output buffer 102A.

In some embodiments, the image adjusting module 130 can adjust, according to a predetermined command (for example, a command for displaying a multi-video mosaic image), a frame having been decoded by the decoder 120 (for example, the first frame or the second frame above) and store the adjusted frame to the output buffer 102A. For example, the decoder 120 can output a decoded frame to the image adjusting module 130 (or store a decoded frame to the output buffer 102A, for the image adjusting module 130 to read the decoded frame from the output buffer 102A), and the image adjusting module 130 can adjust (for example, image processing such as scaling down or cropping) the received frame according to the predetermined command to generate a frame awaiting to be displayed and store the frame awaiting to be displayed to the output buffer 102A. In some embodiments, the image adjusting module 130 can further adjust the frame stored in the output buffer 102A according to a user command. For example, in response to a scaling command of a user, the image adjusting module 130 can scale up (or scale down) and output an image content of a specific frame to a screen via the display interface 140 to display the adjusted image contents. Alternatively, in response to a crop command of a user, the image adjusting module 130 can crop and output an image content of a specific frame to a screen via the display interface 140 to display the cropped image content. In some embodiments, the user may input the related command above via a user interface (for example but not limited to, an interface implemented by software), and a processor circuit (not shown) in the system may receive the user command and issue a corresponding control command or control signal (not shown) for a related module and/or circuit in the image decoding device 100 to perform a corresponding operation. In some embodiments, the image adjusting module 130 may include a circuit such as, for example but not limited to, a scaler circuit. In some embodiments, the display interface 140 may be, for example but not limited to, a video output circuit.

For example, when multiple image contents (having been processed by the image adjusting module and tiled into one single picture) corresponding to the multiple video data D[1] to D[n] are viewed, if the user is interested in the image content of a specific video data (for example, the video data D[1]) and issues a still frame command, the image decoding device 100 may pause the original image decoding operation in response to the still frame command, and continue to output the image content of the corresponding frame in the specific video data to the screen to display the image content as one single picture. In the process above, the decoder 120 can prohibit writing of the reference buffer 101A in response to the still frame command to prevent overwriting of the reference frame therein, and repeatedly decode the corresponding frame by using the reference frame in the reference buffer 101A in response to a refresh command, for the display interface 140 to continue outputting the image content corresponding the frame to the screen for display. Thus, the user can view the same image content (equivalent to viewing a still image) having a display resolution higher than the original resolution of the frame. Once the still frame operation ends, the image decoding device 100 can resume the original image decoding operation, and sequentially update the reference frame in the reference buffer 101A to sequentially perform image decoding. Related operation details are to be described with reference to FIG. 3A and FIG. 3B below. In different embodiments, the image decoding device 100 may collaboratively operate with software, firmware or other circuits in the system, so as to perform multiple applications of image decoding and/or still frame operations.

Figure 2:
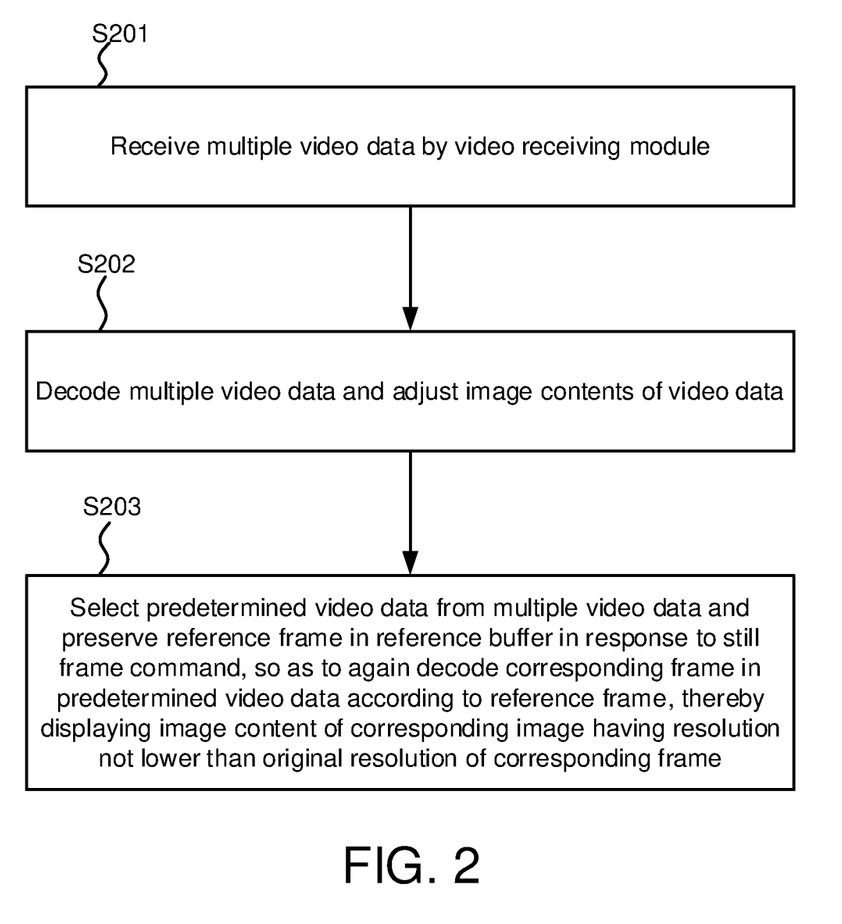
FIG. 2 is a flowchart of operations in response to a still frame command according to some embodiments of the present application.

FIG. 2 shows a flowchart of operations in response to a still frame command according to some embodiments of the present application. For better illustration, a numeral n in FIG. 1 is set to 4 in the description below. In this example, the resolution of images output by the display interface 140 is set to be 1920*1080.

In operation S201, multiple video data are received by a video receiving module. For example, the video receiving module 110 may receive multiple video data D[1] to D[4] from multiple channels, and an original resolution of each of the multiple video data D[1] to D[4] may be 1920*1080.

In operation S202, the multiple video data are decoded, and image contents of these video data are adjusted. For example, the decoder 120 may decode the frames of each of the multiple video data D[1] to D[4], wherein the resolution of each of the frames is 1920*1080. In some embodiments, the image adjusting module 130 may adjust an output resolution of each of the frames to be 960*540, and tile a corresponding frame of each of the multiple video data D[1] to D[4] into one single picture (having a resolution corresponding to that of a screen, for example, 1920*1080). In some other embodiments, the image adjusting module 130 may adjust an output resolution of each of the frames to be 960*540, further crop the image content of at least one of the multiple video data D[1] to D[4], and tile a corresponding frame (having a resolution of 960*540) of each of the multiple video data D[1] to D[4] into one single picture (having a resolution of 1920*1080).

In operation S203, in response to a still frame command, a specific video data is selected from the multiple video data, and a reference frame in a reference buffer is preserved so as to again decode a corresponding frame in the specific video data according to the reference frame. Compared to the display resolution of the corresponding frame before the still frame command, the reference frame is preserved and the corresponding frame is again decoded according to the reference frame in response to the still command, such that the display resolution of the corresponding frame is increased so as to display the image content of the corresponding image. For example, if a user is interested in the image content of the video data D[1], the user may send a still frame command via software to focus on viewing of the image content of the video data D[1]. In response to the still frame command, the decoder 120 can prohibit writing of the reference buffer 101 so as to preserve the reference frame. Next, in response to a refresh command, the decoder 120 can decode a corresponding frame in the video data D[1] (for example, a frame after the decoder 120 receives the still frame command) repeatedly according to the reference frame. Thus, the corresponding frame having a quality with at least the original resolution is obtained without the adjustment of the image adjusting module 130, and the corresponding frame is output to the screen via the display interface 140, thereby displaying the image content of the corresponding image having a resolution not lower than the original resolution of the corresponding frame. The original resolution of the corresponding frame is 1920*1080. As such, the user can view the image content of the corresponding frame at a clear resolution (for example, corresponding to the original resolution of the screen, that is, 1920*1080 described above) on the screen.

In some related art, the reference frame in the reference buffer is constantly updated. In other words, in such prior art, each time a new frame has been decoded, an original reference frame stored in the reference buffer is lost (that is, overwritten by the new frame). Hence, in such prior art, when a user executes a still frame command, scaling up can be performed only according to a frame having been edited (for example, having been adjusted to have a resolution of 960*540 or having been cropped) to generate one single picture (having a resolution of 1920*1080). As a result, the image of the one single picture may become distorted and unclear. Compared to the related art above, in some embodiments of the present application, the reference frame in the reference buffer 101A is not overwritten after the decoder 120 receives the still frame command. In other words, the decoder 120 does not lose information of the reference frame, and can use the reference frame to repeatedly decode the corresponding frame in specific video data (instead of scaling up a frame having been edited), so as to display the image content of the corresponding frame at a resolution not lower than the original resolution of the corresponding frame. Thus, the image decoding device 100 can provide a still frame image with better clarity.

Figure 3A:
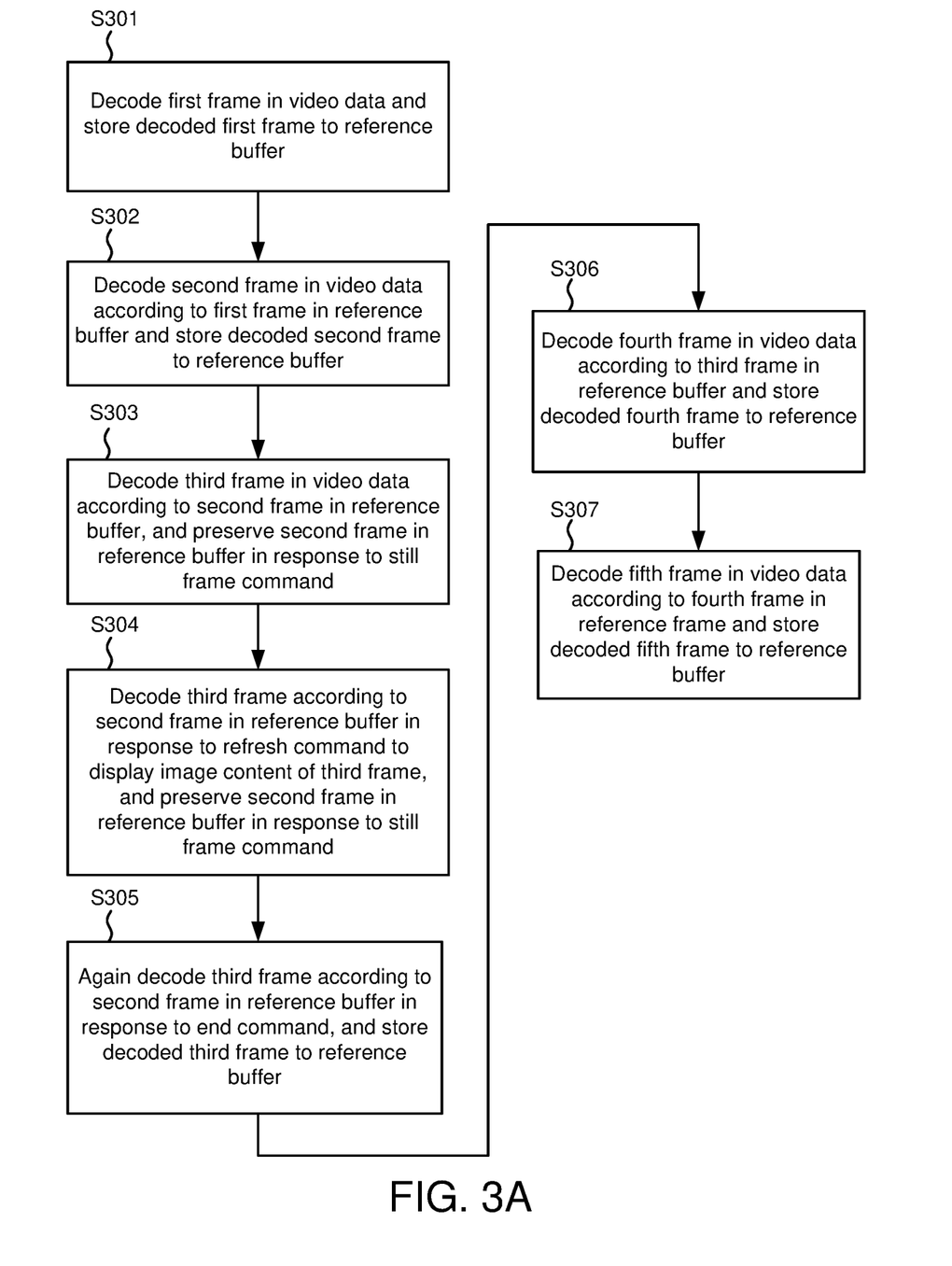
FIG. 3A is a flowchart of still frame operations performed by the decoder in FIG. 1 according to some embodiments of the present application.
Figure 3B:
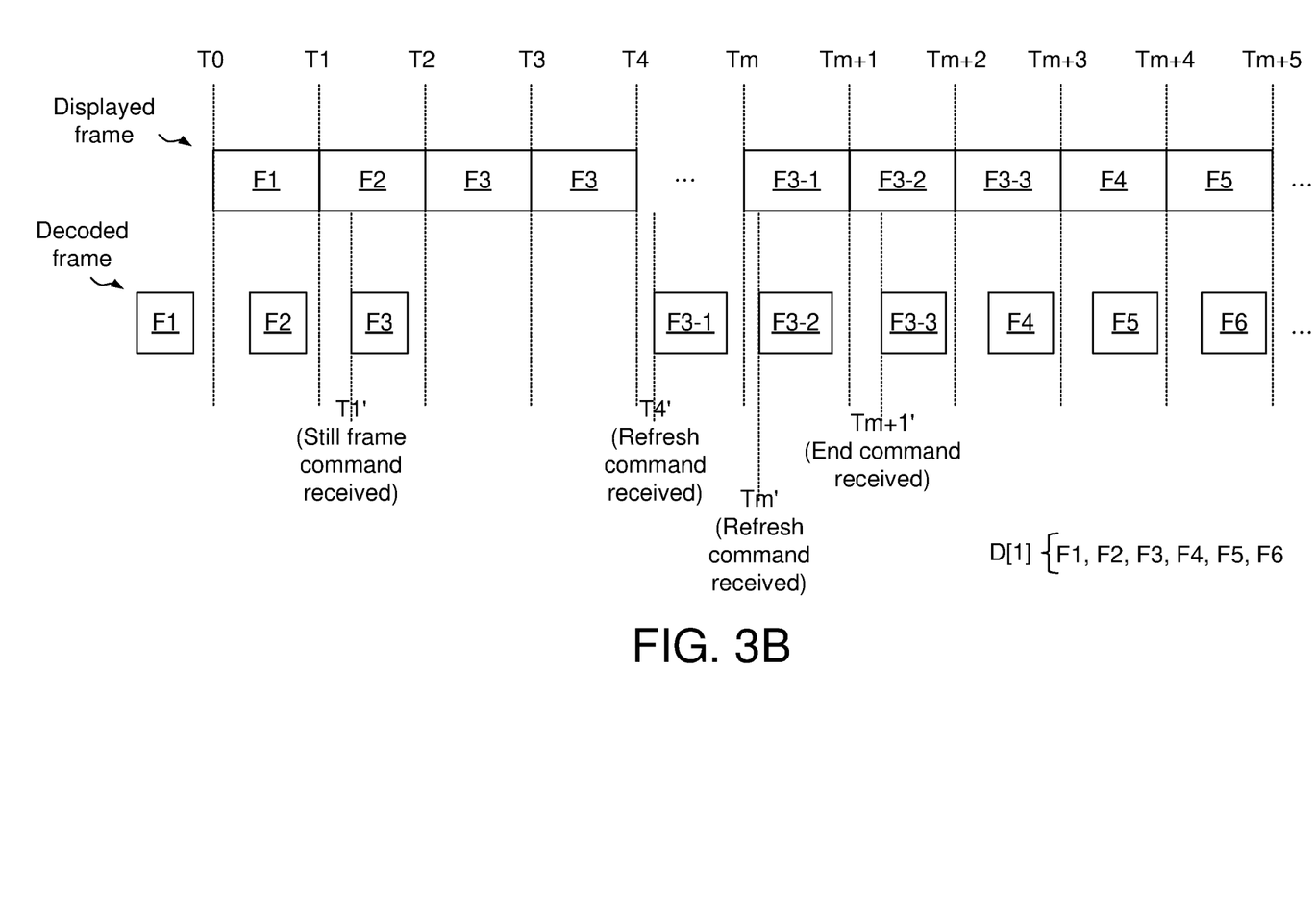
FIG. 3B is a timing diagram of image decoding operations performed by the decoder in FIG. 1 according to some embodiments of the present application.

FIG. 3A shows a flowchart of still frame operations performed by the decoder 120 in FIG. 1 according to some embodiments of the present application, and FIG. 3B shows a timing diagram of image decoding operations performed by the decoder 120 in FIG. 1 according to some embodiments of the present application. For better illustration, multiple operations in FIG. 3A are described with reference to the operation timings in FIG. 3B, wherein the timings in FIG. 3B are examples of multiple frames in video data (for example, the video data D[1]) selected based on a still frame command.

In operation S301, a first frame in the video data is decoded, and the decoded first frame is stored to a reference buffer. For example, as shown in FIG. 3B, before a timing T0, the decoder 120 can decode a first frame F1 in the video data D[1] by means of intra-frame coding, and store the decoded first frame F1 to the reference buffer 101A. In this case, at least one part of the reference frame in the reference buffer 101A is overwritten by the decoded frame F1. Before the timing T0, the image adjusting module 130 adjusts the decoded frame F1 according to a predetermined command, and stores the adjusted frame F1 awaiting to be displayed to the output buffer 102A.

In operation S302, a second frame in the video data is decoded according to the first frame in the reference buffer, and the decoded second frame is stored to the reference buffer. For example, as shown in FIG. 3B, at the timing T0, the display interface 140 may output the frame F1 awaiting to be displayed from the output buffer 102A to the screen, for the screen to display the image content of the frame F1. On the other hand, in a period between the timing T0 and a timing T1, the decoder 120 may decode a frame F2 in the video data D[1] by means of inter-frame coding according to the frame F1 stored in the reference buffer 101A, and store the decoded frame F2 to the reference buffer 101A. In this case, at least one part of the reference frame F1 in the reference buffer 101A is overwritten by the frame F2. In the period between the timing T0 and the timing T1, the image adjusting module 130 adjusts the frame F2 according to a predetermined command, and stores the adjusted frame F2 awaiting to be displayed to the output buffer 102A.

In operation S303, a third frame in the video data is decoded according to the second frame in the reference buffer, and the second frame in the reference buffer is preserved in response to a still frame command. For example, as shown in FIG. 3B, at the timing T1, the display interface 140 can output the frame F2 awaiting to be displayed from the output buffer 102A to the screen, for displaying the image content of the frame F2 on the screen. On the other hand, in a period between the timing T1 and a timing T2, the decoder 120 can decode a frame F3 in the video data D[1] by means of inter-frame coding according to the frame F2 stored in the reference buffer 101A, and the image adjusting module 130 adjusts the decoded frame F3 and stores the adjusted frame F3 awaiting to be displayed to the output buffer 102A. At a timing T1' (between the timing T1 and the timing T2, that is, before starting decoding the frame F3), the decoder 120 receives the still frame command and prohibits writing of the reference buffer 101A in response to the still frame command, so as to prevent the frame F2 in the reference buffer 101A from being overwritten. In this case, the reference frame in the reference buffer 101A is kept as the frame F2 but is not overwritten by the frame F3.

In an alternative embodiment, at a time between the timing T1' and the timing T2, that is, the frame F3 is being decoded but not completed (for example only some blocks of the frame F3 has been decoded), the decoder 120 receives the still frame command. In this situation, the decoder 120 determines current decoding of the frame F3 is not completed, still decodes the frame F3 until the frame F3 has been decoded and stores the frame F3 to the reference buffer 101A as a new reference frame to overwrite at least one part of the frame F2. Then, the decoder 120 prohibits writing of the reference buffer 101A in response to the still frame command, so as to prevent the frame F3 in the reference buffer 101A from being overwritten. Thus, the decoder 120 can repeatedly decode the frame F4 according to the frame F3 in the reference buffer 101A.

In other words, before the still frame command is received, the decoder 120 stores the newly decoded frame to the reference buffer 101A. Thus, at least one part of the reference frame in the reference buffer 101A is overwritten by the new frame. After the still frame command is received, the decoder 120 prohibits writing of the reference buffer 101. Thus, the reference frame in the reference buffer 101A is not overwritten by the new frame.

As shown in FIG. 3B, in some embodiments, in multiple periods between the timing T2 at which the still frame command is received and a timing Tm, the display interface 140 may continue outputting the frame F3 from the output buffer 102A to the screen, for displaying the image content of the frame F3 on the screen. Alternatively, in some other embodiments, according to data format requirements and/or other requirements, the decoder 120 can again decode the frame F3 according to the frame F2 in the reference buffer 102A, and again write the decoded frame F3 (which is not adjusted by the image adjusting module 130) to the output buffer 102A, for outputting the frame F3 via the display interface 140 from the output buffer 102A to the screen for display. On the other hand, in multiple periods between the timing T1' and the timing Tm, the decoder 120 continues prohibiting from writing of the reference buffer 101A in response to the still frame command, so as to prevent the frame F2 in the reference buffer 101 from being overwritten. In this case, the reference frame in the reference buffer 101A is kept as the frame F2.

In operation S304, in response to a refresh command, the third frame is decoded according to the second frame in the reference buffer, and the second frame in the reference buffer is preserved in response to the still frame command. As shown in FIG. 3B, at a timing T4' (between the timing T4 and the timing Tm) after the still frame command is received, the decoder 120 again decodes the frame F3 according to the frame F2 in the reference buffer 101A in response to the refresh command, and stores the decoded frame F3 (denoted as frame F3-1) to the output buffer 102A. Thus, at the timing Tm, the display interface 140 can output the frame F3-1 from the output buffer 102A to the screen to display the image content of the frame F3-1. Similarly, at a timing Tm' (between the timing Tm and a timing Tm+1), the decoder 120 can again decode the frame F3 according to the frame F2 in the reference buffer 101A in response to the refresh command, and store the decoded frame F3 (denoted as frame F3-2) to the output buffer 102A. Thus, at the timing Tm+1, the display interface 140 can output the frame F3-2 from the output buffer 102A to the screen, for displaying the image content of the frame F3-2 on the screen. In the process above, the decoder 120 continues prohibiting writing of the reference buffer 101A, so as to prevent the frame F2 in the reference buffer 101A from being overwritten.

In some embodiments, the refresh command may originate from an edit command such as scaling or cropping the image content of a frame. For example, when a user is interested in a specific object in the image of the frame F3, the user may edit the image content of the frame F3 through a crop command and/or a scaling up command so as to view the specific object with better clarity. In this case, the processor may issue a refresh command in response to the command above to request the decoder 120 to again decode the frame F3, an edit operation such as cropping and/or scaling up above is performed on the image content of the frame F3 by the image adjusting module 130 to generate the frame F3-1 or F3-2 (having image contents associated with the frame F3, for example but not limited to, at least one part of the image content of the frame F3), and the frame F3-1 or the frame F3-2 is stored to the output buffer 102A.

Again referring to FIG. 3A, in operation S305, the third frame in the video data is again decoded according to the second frame in the reference buffer in response to an end command, and the decoded third frame is stored to the reference buffer. As shown in FIG. 3B, at a timing Tm+1' (between the timing Tm+1 and a timing Tm+2), the user issues an end command to deactivate the still frame function. In response to the end command, the decoder 120 allows writing of the reference buffer 101A so as to resume the original image decoding operation. For example, the decoder 120 can again decode the frame F3 according to the reference frame F2 in the reference buffer 101A and store the decoded frame (denoted as F3-3 having an image content identical to that of the frame F3) to the reference buffer 101A to overwrite at least one part of the frame F2. In this case, the reference frame in the reference buffer 101A is updated to the frame F3-3 (that is, at least one part of the original frame F2 is overwritten by the new frame F3-3). On the other hand, the image adjusting module 130 can adjust the frame F3-3 and store the adjusted frame F3-3 to the output buffer 102A.

In an alternative embodiment, at a time between the timing Tm+1' and the timing Tm+2, that is, the frame F3 is being decoded but not completed (namely only some blocks of the frame F3 has been decoded), the decoder 120 receives the end command. In this situation, the decoder 120 determines current decoding of the frame F3 is not completed, and still decodes the frame F3 while preserving the second frame F2 at the reference location until the frame F3 has been decoded. Then, the decoder 120 again decodes the frame F3 according to the second frame F2 in the reference buffer 101A in response to the end command, and stores the decoded frame F3 to the reference buffer 101A thus rewriting at least some part of the second frame F2 in the reference buffer 101A.

In operation S306, a fourth frame in the video data is decoded according to the third frame in the reference buffer, and the decoded fourth frame is stored to the reference buffer. For example, as shown in FIG. 3B, at the timing Tm+2, the display interface 140 can output the adjusted frame F3-3 awaiting to be displayed from the output buffer 102A to the screen, for displaying the image content of the frame F3-3. On the other hand, in a period between the timing Tm+2 and a timing Tm+3, the decoder 120 can decode the frame F4 in the video data D[1] according to the frame F3-3 stored in the reference buffer 101A, and store the decoded frame F4 to the reference buffer 101A so as to overwrite at least one part of the frame F3. Moreover, the image adjusting module 130 can adjust the decoded frame F4 and store the adjusted frame F4 to the output buffer 102A. In this case, the reference frame in the reference buffer 101A is updated to the frame F4.

In operation S307, a fifth frame in the video data is decoded according to the fourth frame in the reference buffer, and the decoded fifth frame is stored to the reference buffer. As shown in FIG. 3B, at a timing Tm+3, the display interface 140 can output the frame F4 from the output buffer 102A to the screen, for displaying the image content of the frame F4. On the other hand, in a period between the timing Tm+3 and a timing Tm+4, the decoder 120 can decode the frame F5 in the video data D[1] according to the frame F4 stored in the reference buffer 101A, and store the decoded frame F5 to the reference buffer 101A so as to overwrite at least one part of the frame F4. Moreover, the image adjusting module 130 can adjust the decoded frame F5 and store the adjusted frame F5 to the output buffer 102A. In this case, the reference frame in the reference buffer 101A is updated to the frame F5. With the similar operations, the display interface 140 can output the frame F5 to the screen at the timing Tm+4, for displaying the image content of the frame F5. The decoder 120 can decode a frame F6 in the video data D[1] in a period between the timing Tm+4 and a timing Tm+5, and store the decoded frame F6 to the reference buffer 101A to overwrite at least one part of the frame F5. The image adjusting module 130 can adjust the frame F6 and store the adjusted frame F6 to the output buffer 102A. Similarly, related operations among the decoder 120, the image adjusting module 130 and the display interface 140 can be understood accordingly.

In some embodiments, the decoder 120 further stores multiple flag signals (not shown) respectively corresponding to the multiple video data D[1] to D[n] in FIG. 1. In response to a still frame command, the decoder 120 can set the flag signal corresponding to the specific video data selected by the still command to a predetermined value, and determine whether to prohibit writing of the reference buffer 101A (for storing frames of the specific video data) by determining a value of the flag signal, so as to prevent the corresponding reference frame from being overwritten and further preserve the reference frame. In other words, software and/or the processor in the system can control the decoder 120 to set the flag signal corresponding to a specific channel to the predetermined value in response to a still frame command, and control the decoder 120 to clear (or reset) the value of the flag signal in response to an end command. Thus, the decoder 120 can determine whether to prohibit writing of a corresponding reference buffer 101A according to the value of the flag signal, so as to perform a still frame operation (for example, operation S303 to operation S305 above).

In FIG. 3, the multiple frames F1, F2, F3, F4, F5 and F6 are consecutive frames in time. In this example, the decoder 120 can use a previous frame as a reference frame, and decode a current frame according to this reference frame. For example, the decoder 120 can use the frame F1 as a reference frame, and decode the frame F2 according to the frame F1. Similarly, the decoder 120 can use the frame F2 as a reference frame, and decode the frame F3 according to the frame F2. It should be noted that the above configuration details are merely examples, and the present application is not limited to these examples. In other embodiments, information of one previous frame, two previous frames, or three previous frames of a current frame may be used as a reference frame to decode the current frame. In other words, the embodiments of the present application are not limited to using only one previous frame as a reference frame for decoding.

Figure 4:
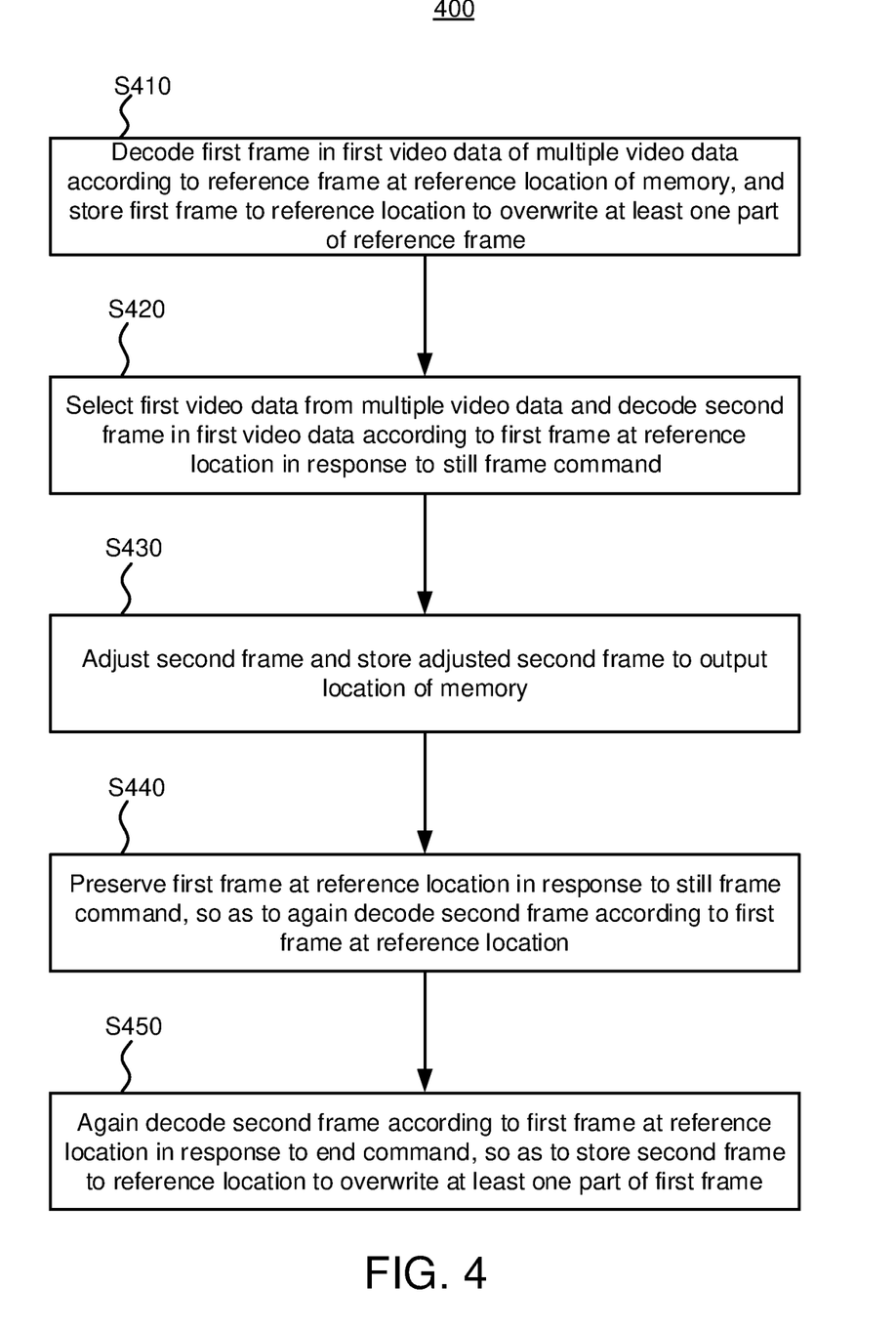
FIG. 4 is a flowchart of a still frame image decoding method according to some embodiments of the present application.

FIG. 4 shows a flowchart of a still frame image decoding method 400 according to some embodiments of the present application. In operation S410, a first frame in first video data of a plurality of video data is decoded according to a reference frame at a reference location of a memory, and the first frame is stored to the reference location to overwrite at least one part of the reference frame. In operation S420, the first video data is selected from the multiple video data and a second frame in the first video data is decoded according to the first frame at the reference location in response to a still frame command. In operation S430, the second frame is adjusted, and the adjusted second frame is stored to an output location of the memory. In operation S440, the first frame at the reference location is preserved in response to the still frame command so as to again decode the second frame according to the first frame at the reference location. In operation S450, the second frame is again decoded according to the first frame at the reference location in response to an end command, so as to store the second frame to the reference location to overwrite at least one part of the first frame.

The details of the plurality of operations above may be referred from the description associated with the foregoing embodiments, and are omitted herein for brevity. The plurality operations of the still frame image decoding method 400 above are merely examples, and are not limited to being performed in the order specified in this example. Without departing from the operation means and ranges of the various embodiments of the present application, additions, replacements, substitutions or omissions may be made to the operations of the still frame image decoding method 400, or the operations may be performed in different orders (for example, simultaneously performed or partially simultaneously performed).

In conclusion, the image decoding device and the still frame image decoding method according to some embodiments of the present application are capable of ensuring that a reference frame is not lost in a still frame operation, thereby generating a still frame image with good clarity. Thus, the issue of distortion of a still frame image can be improved.

While the present application has been described by way of example and in terms of the preferred embodiments, it is to be understood that the disclosure is not limited thereto. Various modifications made be made to the technical features of the present application by a person skilled in the art on the basis of the explicit or implicit disclosures of the present application. The scope of the appended claims of the present application therefore should be accorded with the broadest interpretation so as to encompass all such modifications.

What is claimed is:

1. A still frame image decoding method, comprising:
decoding a first frame in first video data of a plurality of video data according to a reference frame at a reference location of a memory, and storing the first frame to the reference location to overwrite at least one part of the reference frame;
selecting the first video data from the plurality of video data and decoding a second frame in the first video data according to the first frame at the reference location in response to a still frame command;
adjusting the second frame, and storing the adjusted second frame to an output location of the memory;
preserving the first frame at the reference location in response to the still frame command, so as to again decode the second frame according to the first frame at the reference location; and
again decoding the second frame according to the first frame at the reference location in response to an end command, so as to store the second frame to the reference location to overwrite at least one part of the first frame.

2. The still frame image decoding method according to claim 1, wherein the preserving of the first frame at the reference location in response to the still frame command comprises:
prohibiting writing of the reference location in response to the still frame command to prevent the first frame at the reference location from being overwritten.

3. The still frame image decoding method according to claim 1, wherein the preserving of the first frame at the reference location in response to the still frame command so as to again decode the second frame according to the first frame at the reference location comprises:
storing the second frame obtained from the again decoding to the output location of the memory.

4. The still frame image decoding method according to claim 1, further comprising:
after receiving the still frame command, again decoding the second frame according to the first frame at the reference location in response to a refresh command.

5. The still frame image decoding method according to claim 4, further comprising:
editing the second frame in response to the refresh command to display an image content of at least one part of the second frame.

6. The still frame image decoding method according to claim 5, wherein the editing of the second frame comprises:
scaling up or cropping the second frame.

7. The still frame image decoding method according to claim 1, wherein the again decoding of the second frame according to the first frame at the reference location in response to an end command so as to store the second frame to the reference location to overwrite at least one part of the first frame comprises:
again decoding the second frame according to the first frame at the reference location in response to the end command;
adjusting the second frame, and storing the adjusted second frame to the output location of the memory; and
storing the second frame to the reference location to overwrite at least one part of the first frame.

8. The still frame image decoding method according to claim 1, further comprises:

when the still frame command is received while the second frame is being decoded, decoding the second frame according to the first frame at the reference location until the second frame has been decoded;
storing the second frame to the reference location as a new reference frame; and
preserving the second frame at the reference location in response to the still frame command, so as to repeatedly decode a third frame according to the second frame at the reference location.

9. The still frame image decoding method according to claim 1, wherein When the end command is received while the second frame is being decoded, the again decoding the second frame according to the first frame at the reference location in response to an end command so as to store the second frame to the reference location to overwrite at least one part of the first frame comprises:
decoding the second frame according to the first frame at the reference location while preserving the first frame at the reference location until the second frame has been decoded,
decoding the second frame once more according to the first frame at the reference location in response to the end command, and
storing the second frame to the reference location to overwrite at least one part of the first frame at the reference location.

10. An image decoding device, comprising:
a video receiving circuit, configured to receive a plurality of video data corresponding to different channels;
an image adjusting circuit; and
a decoder, configured to:
decode a first frame in first video data of a plurality of video data according to a reference frame at a reference location of a memory, and store the first frame to the reference location to overwrite at least one part of the reference frame;
select the first video data from the plurality of video data and decode a second frame in the first video data according to the first frame at the reference location in response to a still frame command, wherein the image adjusting module adjusts the second frame and stores the adjusted second frame to an output location of the memory;
preserve the first frame at the reference location in response to the still frame command so as to again decode the second frame according to the first frame at the reference location; and
again decode the second frame according to the first frame at the reference location in response to an end command, so as to store the second frame to the reference location to overwrite at least one part of the first frame.

11. The image decoding device according to claim 10, wherein the decoder prohibits writing of the reference location in response to the still frame command to prevent the first frame at the reference location from being overwritten.

12. The image decoding device according to claim 10, wherein the decoder further stores the second frame obtained from the again decoding to the output location of the memory.

13. The image decoding device according to claim 10, wherein after the still frame command is received, the second frame is again decoded according to the first frame at the reference location in response to a refresh command.

14. The image decoding device according to claim 13, wherein the image adjusting circuit edits the second frame in response to the refresh command, for displaying an image content of at least one part of the second frame.

15. The image decoding device according to claim 14, wherein the image adjusting circuit scales up or crops the second frame to edit the second frame.

16. The image decoding device according to claim 10, wherein the decoder again decodes the second frame according to the first frame at the reference location in response to the end command, and stores the second frame to the first frame at the reference location to overwrite at least one part of the first frame, and the image adjusting circuit adjusts the second frame to store the adjusted second frame to the output location of the memory.

17. The image decoding device according to claim 10, wherein when the still frame command is received while the second frame is being decoded, the decoder further decodes the second frame according to the first frame at the reference location until the second frame has been decoded;

stores the second frame to the reference location as a new reference frame; and preserve the second frame at the reference location in response to the still frame command, so as to repeatedly decode a third frame according to the second frame at the reference location.

18. The still frame image decoding device according to claim 10, wherein When the end command is received while the second frame is being decoded, the decode configured to again decode the second frame according to the first frame at the reference location in response to an end command so as to store the second frame to the reference location to overwrite at least one part of the first frame comprises:

the decoder decodes the second frame according to the first frame at the reference location while preserving the first frame at the reference location until the second frame has been decoded, decodes the second frame once more according to the first frame at the reference location in response to the end command, and stores the second frame to the reference location to overwrite at least one part of the first frame at the reference location.

* * * * *